US008396360B2

(12) United States Patent  
Healey et al.

(10) Patent No.: US 8,396,360 B2
(45) Date of Patent: Mar. 12, 2013

(54) COMMUNICATING INFORMATION

(75) Inventors: Peter Healey, Ipswich (GB); Edmund S R Sikora, Ipswich (GB)

(73) Assignee: British Telecommunications Public Limited Company, London (GB)

(*) Notice: Subject to any disclaimer, the term of this patent is extended or adjusted under 35 U.S.C. 154(b) by 640 days.

(21) Appl. No.: 11/887,382

(22) PCT Filed: Mar. 29, 2006

(86) PCT No.: PCT/GB2006/001173
§ 371 (c)(1),
(2), (4) Date: Sep. 28, 2007

(87) PCT Pub. No.: WO2006/103447
PCT Pub. Date: Oct. 5, 2006

(65) Prior Publication Data
US 2008/0219660 A1 Sep. 11, 2008

(30) Foreign Application Priority Data

Mar. 31, 2005 (EP) .................................... 05252024

(51) Int. Cl.
*H04B 10/08* (2006.01)
(52) U.S. Cl. ................. 398/16; 398/9; 398/13; 356/477
(58) Field of Classification Search ............... 398/9, 16, 398/25, 28, 30, 31, 33, 151, 170, 183, 188, 398/212, 214; 385/12, 13, 31; 356/483
See application file for complete search history.

(56) References Cited

U.S. PATENT DOCUMENTS

| 4,297,887 | A | 11/1981 | Bucaro |
| 4,370,610 | A | 1/1983 | Allen |
| 4,397,551 | A | 8/1983 | Bage et al. |
| 4,443,700 | A | 4/1984 | Macedo et al. |
| 4,463,451 | A | 7/1984 | Warmack et al. |
| 4,538,103 | A | 8/1985 | Cappon |
| 4,572,949 | A * | 2/1986 | Bowers et al. ........... 250/227.27 |
| 4,593,385 | A | 6/1986 | Chamuel |

(Continued)

FOREIGN PATENT DOCUMENTS

| EP | 0 251 632 A | 1/1988 |
| EP | 0 251 632 A2 | 1/1988 |

(Continued)

OTHER PUBLICATIONS

U.S. Appl. No. 10/573,266, filed Mar. 23, 2006, Sikora et al.

(Continued)

*Primary Examiner* — Li Liu
(74) *Attorney, Agent, or Firm* — Patterson Thuente Pedersen, P.A.

(57) ABSTRACT

The present invention relates to the communication of information where the information is introduced at a plurality of spaced apart locations onto an optical waveguide. The following steps are performed: (i) transmitting test signals onto the waveguide, components of the test signals being returned in a distributed manner along the waveguide; (ii) receiving first component signals returned from beyond a first location at which information is introduced; (iii) receiving second component signals returned from beyond a second location at which information is introduced, the second component signals being returned through the first location; and, (iv) processing the second component signals using the first component signals to distinguish information introduced at the second location from information introduced at the first location.

10 Claims, 2 Drawing Sheets

U.S. PATENT DOCUMENTS

| Patent No. | | Date | Inventor |
|---|---|---|---|
| 4,649,529 | A | 3/1987 | Avicola |
| 4,654,520 | A | 3/1987 | Griffiths |
| 4,668,191 | A | 5/1987 | Plischka |
| 4,688,200 | A | 8/1987 | Poorman et al. |
| 4,697,926 | A | 10/1987 | Youngquist et al. |
| 4,708,471 | A | 11/1987 | Beckmann et al. |
| 4,708,480 | A | 11/1987 | Sasayama et al. |
| 4,770,535 | A | 9/1988 | Kim et al. |
| 4,781,056 | A | 11/1988 | Noel et al. |
| 4,805,160 | A | 2/1989 | Ishii et al. |
| 4,847,596 | A | 7/1989 | Jacobson et al. |
| 4,885,462 | A | 12/1989 | Dakin |
| 4,885,915 | A | 12/1989 | Jakobsson |
| 4,897,543 | A | 1/1990 | Kersey |
| 4,907,856 | A | 3/1990 | Hickernell |
| 4,976,507 | A | 12/1990 | Udd |
| 4,991,923 | A | 2/1991 | Kino et al. |
| 4,994,668 | A | 2/1991 | Lagakos et al. |
| 4,994,886 | A | 2/1991 | Nadd |
| 5,004,912 | A | 4/1991 | Martens et al. |
| 5,015,842 | A | 5/1991 | Fradenburgh et al. |
| 5,025,423 | A | 6/1991 | Earp |
| 5,046,848 | A | 9/1991 | Udd |
| 5,051,965 | A | 9/1991 | Poorman |
| 5,093,568 | A | 3/1992 | Maycock |
| 5,104,391 | A | 4/1992 | Ingle et al. |
| 5,140,559 | A | 8/1992 | Fisher |
| 5,173,743 | A | 12/1992 | Kim |
| 5,187,362 | A | 2/1993 | Keeble |
| 5,191,614 | A | 3/1993 | LeCong |
| 5,194,847 | A | 3/1993 | Taylor et al. |
| 5,206,924 | A | 4/1993 | Kersey |
| 5,223,967 | A | 6/1993 | Udd |
| 5,307,410 | A | 4/1994 | Bennett |
| 5,311,592 | A | 5/1994 | Udd |
| 5,313,266 | A | 5/1994 | Keolian et al. |
| 5,319,609 | A | 6/1994 | Regnault |
| 5,351,318 | A | 9/1994 | Howell et al. |
| 5,355,208 | A | 10/1994 | Crawford et al. |
| 5,359,412 | A | 10/1994 | Schulz |
| 5,361,130 | A | 11/1994 | Kersey et al. |
| 5,363,463 | A | 11/1994 | Kleinerman |
| 5,373,487 | A | 12/1994 | Crawford et al. |
| 5,379,357 | A | 1/1995 | Sentsui et al. |
| 5,384,635 | A | 1/1995 | Cohen |
| 5,412,464 | A | 5/1995 | Thomas et al. |
| 5,453,827 | A * | 9/1995 | Lee ............... 356/73.1 |
| 5,457,998 | A | 10/1995 | Fujisaki et al. |
| 5,473,459 | A | 12/1995 | Davis |
| 5,491,573 | A | 2/1996 | Shipley |
| 5,497,233 | A | 3/1996 | Meyer |
| 5,500,733 | A | 3/1996 | Boisrobert et al. |
| 5,502,782 | A | 3/1996 | Smith |
| 5,511,086 | A | 4/1996 | Su |
| 5,592,282 | A | 1/1997 | Hartog |
| 5,604,318 | A | 2/1997 | Fasshauer |
| 5,636,021 | A | 6/1997 | Udd |
| 5,637,865 | A | 6/1997 | Bullat et al. |
| 5,663,927 | A | 9/1997 | Olson et al. |
| 5,691,957 | A | 11/1997 | Spiesberger |
| 5,694,114 | A | 12/1997 | Udd |
| 5,754,293 | A | 5/1998 | Farhadiroushan |
| 5,767,950 | A | 6/1998 | Hawver et al. |
| 5,778,114 | A | 7/1998 | Eslambolchi et al. |
| 5,936,719 | A | 8/1999 | Johnson |
| 5,975,697 | A | 11/1999 | Podoleanu et al. |
| 5,982,791 | A | 11/1999 | Sorin |
| 5,991,479 | A * | 11/1999 | Kleinerman ............... 385/31 |
| 6,072,921 | A | 6/2000 | Frederick et al. |
| 6,075,628 | A | 6/2000 | Fisher et al. |
| 6,115,520 | A | 9/2000 | Laskowski et al. |
| 6,148,123 | A | 11/2000 | Eslambolchi |
| 6,185,020 | B1 * | 2/2001 | Horiuchi et al. ............... 398/31 |
| 6,194,706 | B1 | 2/2001 | Ressl |
| 6,195,162 | B1 | 2/2001 | Varnham et al. |
| 6,211,950 | B1 * | 4/2001 | Walter ............... 356/73.1 |
| 6,269,198 | B1 | 7/2001 | Hodgson et al. |
| 6,269,204 | B1 | 7/2001 | Ishikawa |
| 6,285,806 | B1 * | 9/2001 | Kersey et al. ............... 385/12 |
| 6,315,463 | B1 | 11/2001 | Kropp |
| 6,381,011 | B1 * | 4/2002 | Nickelsberg et al. ............... 356/73.1 |
| 6,459,486 | B1 * | 10/2002 | Udd et al. ............... 356/483 |
| 6,487,346 | B2 | 11/2002 | Nothofer |
| 6,489,606 | B1 * | 12/2002 | Kersey et al. ............... 250/227.14 |
| 6,594,055 | B2 | 7/2003 | Snawerdt |
| 6,625,083 | B2 | 9/2003 | Vandenbroucke |
| 6,628,570 | B2 | 9/2003 | Ruffa |
| 6,704,420 | B1 | 3/2004 | Goedgebuer et al. |
| 6,788,417 | B1 | 9/2004 | Zumberge et al. |
| 6,813,403 | B2 * | 11/2004 | Tennyson ............... 385/12 |
| 6,859,419 | B1 | 2/2005 | Blackmon et al. |
| 6,943,872 | B2 | 9/2005 | Endo et al. |
| 7,006,230 | B2 | 2/2006 | Dorrer et al. |
| 7,110,677 | B2 | 9/2006 | Reingand |
| 7,266,299 | B1 * | 9/2007 | Bock et al. ............... 398/85 |
| 7,289,729 | B1 * | 10/2007 | Eslambolchi et al. ............... 398/28 |
| 7,397,568 | B2 | 7/2008 | Bryce |
| 7,536,102 | B1 | 5/2009 | Huffman et al. |
| 7,548,319 | B2 | 6/2009 | Hartog |
| 7,656,535 | B2 | 2/2010 | Healey et al. |
| 7,667,849 | B2 | 2/2010 | Sikora et al. |
| 7,697,795 | B2 | 4/2010 | Heatley et al. |
| 7,725,026 | B2 | 5/2010 | Patel et al. |
| 7,755,971 | B2 | 7/2010 | Heatley et al. |
| 7,796,896 | B2 | 9/2010 | Sikora et al. |
| 7,817,279 | B2 | 10/2010 | Healey |
| 7,848,645 | B2 | 12/2010 | Healey et al. |
| 7,961,331 | B2 | 6/2011 | Healey |
| 7,974,182 | B2 | 7/2011 | Healey et al. |
| 7,995,197 | B2 | 8/2011 | Sikora et al. |
| 8,000,609 | B2 | 8/2011 | Healey et al. |
| 8,003,932 | B2 | 8/2011 | Sikora et al. |
| 8,027,584 | B2 | 9/2011 | Healey et al. |
| 2001/0028766 | A1 | 10/2001 | Hatami-Hanza |
| 2002/0196447 | A1 | 12/2002 | Nakamura et al. |
| 2003/0103211 | A1 | 6/2003 | Lange et al. |
| 2003/0117893 | A1 | 6/2003 | Bary |
| 2003/0174924 | A1 | 9/2003 | Tennyson |
| 2004/0027560 | A1 | 2/2004 | Fredin et al. |
| 2004/0095569 | A1 * | 5/2004 | Kan ............... 356/73.1 |
| 2004/0113056 | A1 | 6/2004 | Everall et al. |
| 2004/0201476 | A1 | 10/2004 | Howard |
| 2004/0208523 | A1 | 10/2004 | Carrick et al. |
| 2004/0227949 | A1 | 11/2004 | Dorrer et al. |
| 2006/0163457 | A1 | 7/2006 | Katsifolis et al. |
| 2006/0256344 | A1 | 11/2006 | Sikora et al. |
| 2007/0009600 | A1 | 1/2007 | Edgren et al. |
| 2007/0065150 | A1 | 3/2007 | Sikora et al. |
| 2007/0127933 | A1 | 6/2007 | Hoshida et al. |
| 2007/0264012 | A1 | 11/2007 | Healey et al. |
| 2008/0013161 | A1 | 1/2008 | Tokura et al. |
| 2008/0018908 | A1 | 1/2008 | Healey et al. |
| 2008/0123085 | A1 | 5/2008 | Sikora et al. |
| 2008/0166120 | A1 | 7/2008 | Heatley et al. |
| 2008/0219093 | A1 | 9/2008 | Heatley et al. |
| 2008/0219660 | A1 | 9/2008 | Healey |
| 2008/0232242 | A1 | 9/2008 | Healey |
| 2008/0278711 | A1 | 11/2008 | Sikora et al. |
| 2009/0014634 | A1 | 1/2009 | Sikora et al. |
| 2009/0097844 | A1 | 4/2009 | Healey |
| 2009/0103928 | A1 | 4/2009 | Healey et al. |
| 2009/0135428 | A1 | 5/2009 | Healey |
| 2009/0252491 | A1 | 10/2009 | Healey |
| 2009/0274456 | A1 | 11/2009 | Healey et al. |

FOREIGN PATENT DOCUMENTS

| | | | |
|---|---|---|---|
| EP | 0 360 449 | A2 | 3/1990 |
| EP | 0364093 | | 4/1990 |
| EP | 0 376 449 | A1 | 7/1990 |
| EP | 0 377 549 | | 7/1990 |
| EP | 0513381 | | 11/1992 |
| EP | 0 592 690 | A1 | 4/1994 |
| EP | 0 794 414 | A2 | 9/1997 |
| EP | 0 821 224 | A2 | 1/1998 |
| EP | 0 953 830 | A2 | 11/1999 |
| EP | 1 037 410 | A2 | 9/2000 |
| EP | 1 096 273 | A2 | 5/2001 |

| | | |
|---|---|---|
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 4115205 | 4/1992 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |
| WO | WO2005/095917 | 10/2005 |

OTHER PUBLICATIONS

U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007, Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/918,434, filed Oct. 12, 2007, Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. 11/403,200.
Office Action dated Aug. 23, 2007 in U.S. Appl. No. 11/403,200.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report for PCT/GB2005/0003680 mailed Dec. 1, 2005.
International Search Report for PCT/GB2005/003594 dated Dec. 16, 2005.
International Search Report mailed Jan. 14, 2005 in International Application No. PCT/GB2004/004169.
International Search Report mailed May 8, 2006 in PCT/GB2006/000750.
UK Search Report dated Dec. 4, 2003 in GB Application No. GB 0322859.0.
UK Search Report dated May 24, 2005 in GB506591.7.
International Search Report dated May 16, 2006 in PCT/GB2005/004850.
International Search Report mailed Jun. 30, 2006 in PCT/GB2006/001173.
International Search Report mailed May 29, 2006 in PCT/GB2006/000759.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 24, 2006 in PCT/GB2006/001325.
International Search Report mailed May 2, 2007 in PCT/GB2007/000359.
International Search Report dated Mar. 15, 2006, mailed Mar. 24, 2006 in PCT/GB2005/004873.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.
Application and File History of U.S. Appl. No. 11/918,434, Inventor: Healey, filed Oct. 12, 2007.
Application and File History of U.S. Appl. No. 12/280,038, Inventor: Healey, filed, Aug. 20, 2008.
Application and File History of U.S. Appl. No. 11/791,927, Inventor: Sikura, filed May 31, 2007.
Application and File History of U.S. Appl. No. 12/295,784, Inventor: Healey, filed Oct. 2, 2008.
Application and File History of U.S. Appl. No. 11/885,275, Inventor: Heatley, filed Aug. 29, 2007.
Application and File History of U.S. Appl. No. 11/885,275, Inventor: Healey, filed Aug. 30, 2007.
State Intellectual Property Office of China, Rejection Decision, Application No. 200580009905.4, dated Dec. 4, 2009, 19 pages.
State Intellectual Property Office of China, Third Notification of Office Action, Application No. 200580009905.4 dated Jun. 19, 2009, 4 pages.
State Intellectual Property Office of China, Second Notification of Office Action, Application No. 200580009905.4 dated Mar. 27, 2009, 4 pages.
State Intellectual Property Office of China, Text of First Office Action, dated Aug. 15, 2008.
European Search Report, Application No. 05733029.1524, dated Apr. 6, 2010, 7 pages.
European Search Report, Application No. 05826466.4-2415, dated Jul. 27, 2010.
Application and File History of U.S. Appl. No. 10/594,433, Inventor: Healey, filed Sep. 26, 2006
Japanese Office Action for Japanese Application No. 2007-505635 mailed Aug. 17, 2010.
Application and File History of U.S. Appl. No. 12/295,784 Inventor: Healey, filed Oct. 2, 2008.
Application and File History of U.S. Appl. No. 12/280,047, Inventor: Healey, filed Aug. 20, 2008
Application and File History of U.S. Appl. No. 12/280,038, Inventor: Healey, filed Aug. 20, 2008.
Application and File History of U.S. Appl. No. 11/663,954, Inventor: Sikora, filed Mar. 28, 2007.
Application and File History of U.S. Appl. No. 11/791,927, Inventor: Sikora, filed May 31, 2007.
Application and File History of U.S. Appl. No. 12/295,784 Inventor: Healey, filed, Oct. 2, 2008.
Application and File History of U.S. Appl. No. 11/918,434 Inventor: Healey, filed Oct. 12, 2007.

Application and File History of U.S. Appl. No. 10/594,433, Inventor: Healey, filed Sep. 26, 2006.

Application and File History of U.S. Appl. No. 12/280,047, Inventor: Healey, filed Aug. 20, 2008.

Application and File History of U.S. Appl. No. 12/280,051, Inventor: Healey, filed Aug. 20, 2008.

Application and File History of U.S. Appl. No. 11/663,957, Inventor: Healey, filed Mar. 28, 2007.

Application and File History of U.S. Appl. No. 11/403,200, Inventor: Sikora, filed Apr. 13, 2006.

Application and File History of U.S. Appl. No. 11/885,275, Inventor: Healey, filed Aug. 29, 2007.

Application and File History of U.S. Appl. No. 11/885,400, Inventor: Heatley, filed Aug. 30, 2007.

Application and File History of U.S. Appl. No. 11/916,054, Inventor: Sikora, filed Nov. 30, 2007.

Application and File History of U.S. Appl. No. 10/573,266, Inventor: Sikora, filed Mar. 23, 2006.

Application and File History of U.S. Appl. No. 11/791,923, Inventor: Healey, filed May 31, 2007.

International Preliminary Report on Patentability and Written Opinion for International Application No. PCT/GB2006/001173 dated Oct. 3, 2007.

* cited by examiner

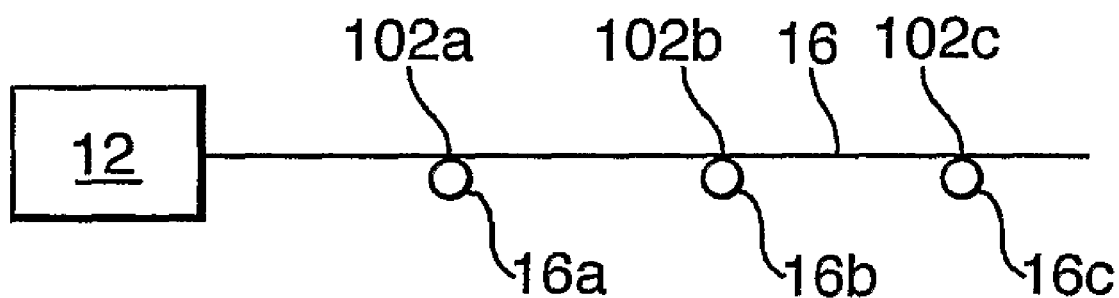
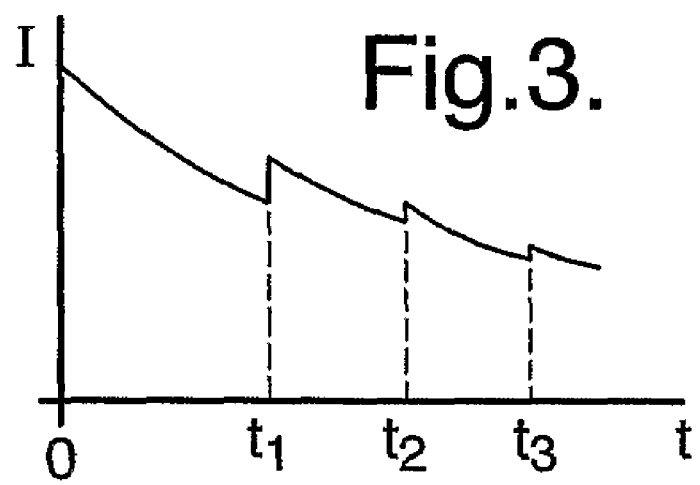

COMMUNICATING INFORMATION

This application is the U.S. national phase of International Application No. PCT/GB2006/001173, filed 29 Mar. 2006, which designated the U.S. and claims priority to European Patent Application No. 05252024.4, filed 31 Mar. 2005, the entire contents of each of which are hereby incorporated by reference.

The present invention relates to the communication of information, in particular where the information is introduced at a plurality of spaced apart locations onto a waveguide.

It is known to introduce information onto a waveguide by modulating light travelling along the waveguide. However, such known techniques can be complicated.

According to one aspect of the present invention, there is provided a communication method in which information is introduced at a plurality of spaced apart locations along an optical waveguide, including the steps of: (i) transmitting test signals onto the waveguide, components of the test signals being returned in a distributed manner along the waveguide; (ii) receiving first component signals returned from beyond a first location at which information is introduced; (iii) receiving second component signals returned from beyond a second location at which information is introduced, the second component signals being returned through the first location; and, (iv) performing a subtraction operation involving the second component signals and the first component signals in order to distinguish information introduced at the second location from information introduced at the first location, wherein the test signals are formed as pairs of signal copies, the signal copies of each pair being transmitted onto the waveguide with a temporal offset relative to one another.

Because the test signals are formed as pairs of signal copies with a temporal offset relative to one another, the signal copies of a given pair are likely to be influenced differently by the information introduced onto the waveguide. The resulting difference can be used to subsequently retrieve the introduced information.

In addition, because account is taken of the first component signal in order to distinguish information introduced at the second location from information introduced at the first location, information may be introduced at the first location whilst information is being introduced at the second location.

Preferably, the test signals will be transmitted in a repetitive manner as optical pulses, each given test signal being formed by a pair of optical pulses.

The pulses will preferably be returned by a process of distributed backscattering, such as Rayleigh backscattering or other backscattering process resulting from inhomogeneities distributed in a substantially uniform manner along the waveguide.

An optical source with a short coherence time will preferably be used to provide the test signals, the light from the source having irregular phase variations occurring on a time scale of the source coherence time. The source coherence time will preferably be less than the temporal offset. A coherence time that is less than the temporal offset by a factor of 10 will be preferable, although a longer coherence time that the temporal offset may be adequate.

The waveguide will preferably be sensitive to acoustic pressure waves, such that the waveguide can act as an acoustic pick-up at the first and second location. Preferably, the waveguide will be arranged such that at sensing locations (such as the first and second locations) where information is to be introduced, the waveguide is more sensitive to acoustic or other disturbances than in the region between the sensing locations. This will facilitate the processing of the return signal in order to distinguish information introduced at the sensing location. The waveguide may be made more sensitive by exposing a larger area of the waveguide at a given location to acoustic disturbance, for example by arranging the waveguide as a coil.

According to a further aspect of the invention, there is provided communication apparatus for receiving information that is introduced at a plurality of spaced apart locations along an optical waveguide, the apparatus including: a source for transmitting a test signal onto the waveguide; a receiver for receiving the test signal that has been returned in a time distributed manner along the waveguide; timer means for evaluating return times; and processor means configured to capture the returned test signal a first and a second return time, and to perform an operation on the return test signal captured at the first and the second return time.

According to yet another aspect of present invention, there is provided a communication method in which information is introduced at a plurality of spaced apart locations along an optical waveguide, the method including the steps of: (i) transmitting a sensing signal onto the waveguide, the test signal being returned in a time distributed manner along the waveguide such that each spaced apart location has a return time associated therewith; (ii) capturing the returned signal at a return time, the return time being chosen in dependence on the location from which information is to be acquired; and (iii) processing the test signal captured at the or each chosen return time in order to acquire the introduced information.

Information may be acquired in this way from one selected location at a time, the selection being effected through the choice of the return time at which the returned signal is captured. However, information may be acquired from a plurality of locations, which locations may or may not be selected from a larger number of locations.

Further aspects of the invention are provided in the appended claims.

The invention will now be further described, by way of example only, with reference to the following drawings:

FIG. 1 shows a communications system according to the present invention;

Figure 2:
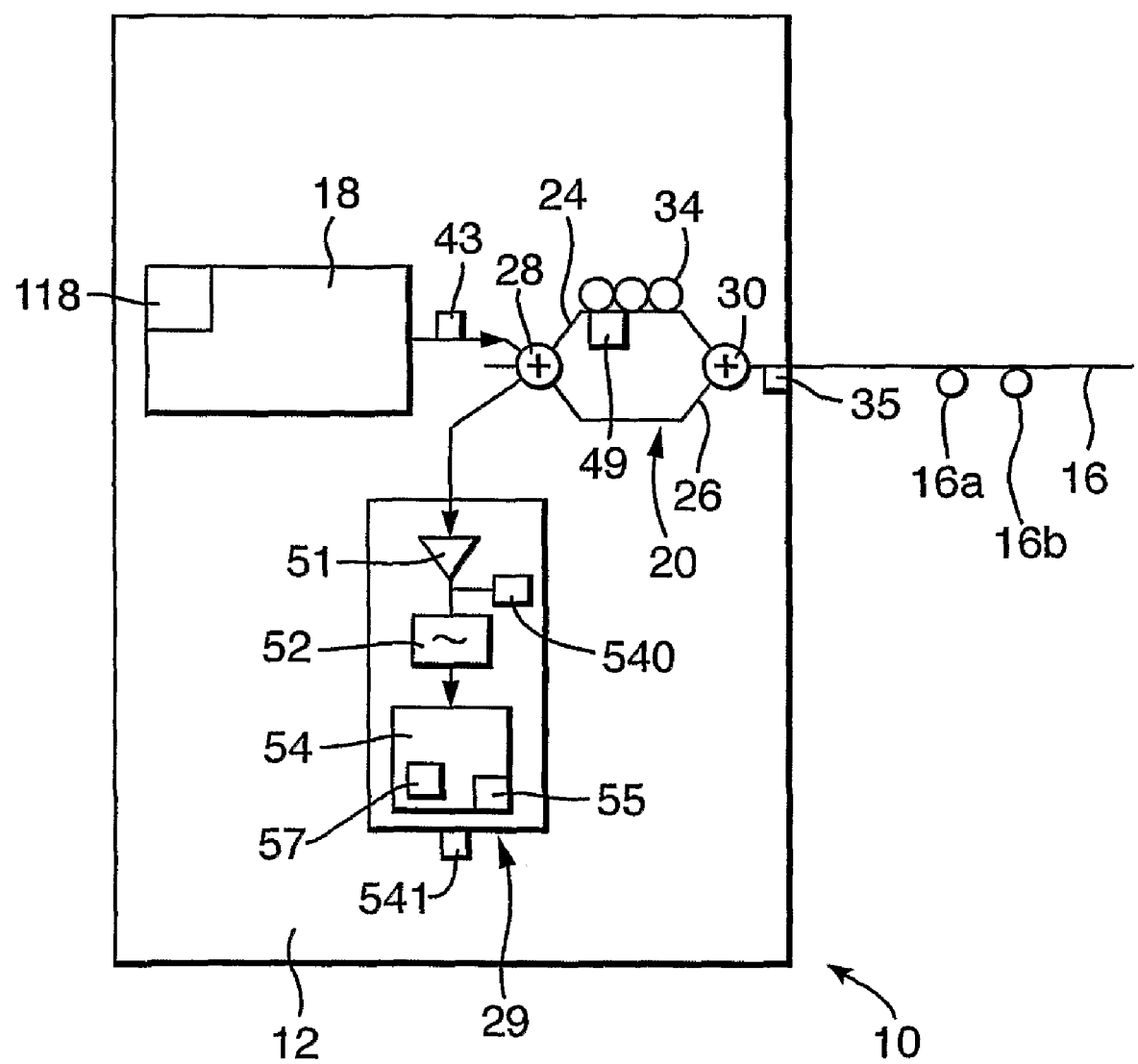
FIG. 2 shows a monitor station for use with the communication system of FIG. 1; and, FIG. 3 shows an illustrative trace of a possible interference signal as a function of time.

FIG. 1 shows a communications system 10 in which a monitoring station 12 is connected to an optical fibre 16. The fibre 16 is coiled at a first, second and third sensing location 102a, 102b, 102c, a respective coil 16a, 16b, 16c being provided at each sensing location. Each coil is arranged as a microphonic pickup to detect acoustic disturbances. In general terms, the monitoring station 12 is arranged to transmit sensing signals onto the fibre 16, which sensing signals are modulated by the acoustic disturbances at the sensing locations, components of the sensing signals being returned by a process of Rayleigh backscattering along the fibre. Returned backscattered components at the monitoring station 12 are then processed to retrieve modulated acoustic information, if any, introduced by the acoustic disturbances at the sensing locations. The monitoring station 12 is configured to allow a determination to be made as to what information has been sensed at each of the sensing locations, in particular where information is introduced t more than one sensing location simultaneously, use being made of the fact that backscattered components returned from different regions of the fibre will return to the monitoring station 12 at different times.

FIG. 2 shows the monitoring station in more detail. The monitoring station 12 includes an optical pulse source 18 with a short coherence time (random phase changes in the output providing an irregular component to the signal). Pulses from the optical source 18 are fed to an interferometer stage 20, here a Mach Zehnder interferometer with a first path 24 and a second path 26, the paths 24, 26 being coupled at each end by a respective first and second coupling stage 28, 30. For light travelling in the outbound direction, the first coupling stage 28 acts as a directional power (intensity) splitter, channelling light from the optical source 18 to each of the paths 24, 26, the power to each path being shared in a predetermined manner (here, the first coupling stage acts as a 50:50 power splitter, although a different ratio could be used).

Thus for each pulse provided by the optical source 18, that pulse is copied such that there is a first copy and a second copy, the first and second copies being in this example duplicates of one another (the copies need not be duplicates of one another, provided that at least some irregular phase changes are common to each copy of a pair). One copy travels along the first path 24 whilst the other copy travels along the second path 26. The second coupling stage 30 is coupled to an output 35 of the interferometer, which output is connected to the fibre 16. For light travelling in the outbound direction, the coupling stage 30 acts as a combiner, channelling light from the first and second paths to the interferometer output 35. The first path of the interferometer has a delay stage 34 for increasing the transit time of light travelling therealong between the first and second coupling stages 28,30, the transit time for light travelling between the coupling stages 28,30 being greater along the first path 24 than along the second path 26. Thus, for each pulse produced by the optical source, the interferometer 20 serves to delay one of the pulse copies relative to the other pulse copy by a delay time D, pulse copies being transmitted onto the same optical fibre 16 but at different times to one another.

The coherence time of the optical source 18 will be less than the duration of the pulses generated by the optical source. The pulse duration is itself less than the delay D imposed by the delay stage 34, such that time separated pulse copies are transmitted onto the optical fibre.

For signals travelling in the return direction, the second coupling stage 30 act as a power splitter, in a similar fashion to the action of the first coupling stage 28 on light in the forward direction (from the optical source 18). In this way, the intensity of return signals is split at the second coupling stage 30, one portion being channelled along the first path 24, whilst the other portion is channelled along the second path 26. The first coupling stage 28 then serves to combine light from the first and second paths in the return direction, channelling the combined light as an interference signal to a signal processing system 29 coupled to an output of the first coupling stage 28.

The signal processing system includes: a photo-receiver 51 coupled to the first coupling stage 28 for converting optical signals into electrical signals; a filter 52 for receiving electrical signals from the photo-receiver 51 and filtering the electrical signals; a first signal processing unit 54 for processing the filtered electrical signals; and an optional further processing unit 540 for performing more detailed processing of the electrical signals. The filter 52 bandwidth is matched to the expected signal bandwidth in order to minimise extraneous noise.

The light source 18 may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 ps or less. The radiation produced by the optical source will preferably be unpolarised, or alternatively a de-polarising unit 43 may be provided between the light source and the interferometer, for depolarising the light before the light is injected into the interferometer (the depolarising unit may be for example, a Fibre Lyot de-polariser). A polarisation controller or de-polariser 49 may be provided in one of the paths of the interferometer, here, the first path, so that the polarisation of light from the first path combining in the return direction at the first coupler 28 is at least partially aligned with that of the light from the other path. A de-polariser also has the advantage of effectively scrambling any polarisation structure in the returning backscatter signal making it much easier to detect loss defects. Typically, the source will operate at a wavelength of between 1 micron and 2 microns, preferably around 1.3 or 1.55 microns, in order to efficiently make use of standard telecommunications optical fibre, such fibre being configured to support single mode transmission at this wavelength. Typically, the fibre will have a single core of a diameter which is around 9 or 10 microns.

The operation of the monitoring station 12 can best be understood by considering return components of outbound pulse copies returned from a particular point on a fibre.

For each pulse generated by the source 18, there will be four resulting signals: a non-retarded signal S0 which has traveled along the second path 26 of the interferometer 20 in both the forward and reverse directions: a first retarded signal S1 delayed by a delay D in the forward direction (but not the reverse direction): a second retarded signal S2 retarded by the delay D in the reverse direction (but nor the forward direction): and, a twice-retarded signal S3 retarded by a delay 2D, signal S3 being retarded in each of the forward and reverse directions.

The first and second retarded signals S1, S2, which are retarded in one direction only will be returned to the first coupling stage 28 at the same time. In the absence of any disturbance or modulation in the fibre 16, these signals are copies of one another (i.e. have the same phase or phase changes) and the signals will interfere or otherwise combine constructively at the first coupling stage 28. However, if one of the pair of the signals S1, S2 is modulated or otherwise modified along the fibre, the signals S1, S2 will no longer interfere constructively. Thus, if a modulation signal is imposed on one or both of the signals S1, S2, this signal or a signal corresponding to the modulation signal will be reproduced when the signals S1, S2 are recombined at the interferometer. In particular, a phase modulation will be reproduced as an amplitude modulation of the interference signal at an output of the first coupling stage.

A phase change on light travelling through the fibre can be effected by acoustic vibrations which are incident onto the fibre. The acoustic vibrations, which take the form of a time varying or dynamic pressure wave, cause an elastic strain wave to propagate into the waveguiding medium of the fibre. The induced strain changes the refractive index of the medium, thereby imposing a phase change on the propagating light. In the present example, the waveguiding medium is the core of the optical fibre, normally formed from silica glass material.

For each pulse produced by the source, the interference signal will be distributed over a time corresponding to the transit time of the pulse copies along the fibre. FIG. 3 shows how the interference signal (I) resulting from a transmitted pulse may be expected to vary with elapsed time from the transmission of the pulse from the source (the trace of FIG. 3 illustrates the general form of a possible measured trace, and is intended for illustrative purposes only). In this trace, each point along the trace corresponds to a position along the fibre at which the signal responsible has been returned. Initially, the pulse copies will have suffered little attenuation through backscattering or loss. Therefore the intensity of the backscattered components, which is related to the intensity of the pulses, is high. In the absence of any modulation, the magnitude of the interference signal is also high.

As the pulse copies travel along the fibre, the pulses are attenuated, as well as the backscattered components, with the result that the interference signal diminishes with time.

After a time t1, returned backscattered components will have originated from pulses which have traveled beyond the first sensing location 102a (the time t1 corresponding to the round trip time to the first sensing location and back). When the pulse copies or the backscattered components pass through the first sensing location 102a, the phase of the backscattered components resulting from the pulse copies will be affected by the acoustic disturbance at the first location. Because the acoustic disturbance changes with time, the relative phase of the backscattered components will be changed, resulting in a sharp change in the interference signal at the time t1. Likewise, a sharp change will occur at a later time t2 and t3, when backscattered components are received which originate from pulse copies that have traveled beyond the second and third sensing locations respectively.

The trace of FIG. 3 represents the interference signal from a single pulse from the source (or equivalently a single set of pulse copies transmitted onto the fibre). A subsequent pulse transmitted from the source will result in a trace having the same general form as that of FIG. 3. However, the phase change which the pulse copies experience is likely be different since the acoustic disturbance changes with time. As a result, the size (and possibly the sign) of the step changes at t1, t2 and t3 are also likely to be different. In the simplified situations when only one of the sensing locations has an acoustic disturbance, the change from pulse to pulse in the level of the interference signal after a step change will be representative of the changes in the acoustic signal itself. Effectively each pulse transmitted by the source thus gives rise to a sampling point along the waveform of the acoustic disturbance.

In order to extract the acoustic signal introduced at the different sensing locations, the processing unit 54 includes a processor 55 and a memory 57. The processor 55 is coupled to a driver 118 of the optical source 18, which driver produces electrical pulse signals which cause the source to generate optical pulses. The processor is also connected to a timer unit which indicates the elapsed time after the transmission of each pulse from the source, the timer being configured to reset when a new pulse is launched. For each pulse generated by the source 18, the processor 55 stores into the memory 57 the value of the returned interference signal at (or just after) t1, t2 and t3 in the form of a table, in which each column corresponds to a respective return time t1, t2 and t3, and each row corresponds to a pulse transmission time (or number if the pulses are transmitted at regular intervals). Thus, the interference signal is stored as values I(tm, Tm), where tm relates to the return time at which the interference signal is sampled, and Tm relates to the transmission time of the pulse giving rise to the sampled interference signal. Values for I(t1, Tm=1, 2, 3 . . . ) effectively correspond to the acoustic signal at the first sensing location 102a, sampled at times Tm=1, 2, 3 . . . (subject to a sample time off-set due to the travel times of the pulses).

Values for I (tm=1, 2, 3 . . . , T1) are the values along the trace produced by the first pulse, sampled at returns times (or just after) t1, t2, t3, ect However, values for the interference signal at the second sensing location 102b, that is, I(t2; Tm=1, 2, 3 . . . ), will include the effects of the modulation at the first sensing location 102a, since the outbound pulse copies and the returning backscattered components will each have been modulated at both the first and second locations. In order to extract the acoustic signal introduced at the second location 102b, the processor 55 is configured to subtract the interference signal values recorded at time t1 from the interference signal values recorded at time t2. This is achieved by subtracting the column for t1 from the column for t2, and storing the result in a further column labelled t2-t1.

In vector notation, where the values for I(tn, Tm=1, 2, 3 . . . ) are expressed as the vector I(tn)=[I(tn,T1), I(tn,T2), I(tn,T3), . . . ], the processor performs the following vector operation: I(t2)−I(t1)=I(t2−t1), where I(t2−t1)=[I(t2, 1)−I(t1, 1), I(t2, 2)−I(t1, 2), I(t2, 3)−I(t1, 3) . . . ]. By performing this operation, the effect of the additional modulation imposed at the first location onto signals modulated at the second location will be mitigated. Thus, the values for I(t2−t1) will provide a closer replication of the acoustic signal at the second location, sampled at times Tm=1, 2, 3 . . . .

Likewise, the signal at time t3 will contain contributions from the modulation at each of the first, second and third locations 102a, 102b, 102c. In order to extract the contribution from the first and second locations, the sampled values for I at time t2 is subtracted from the corresponding sampled values at time t3, since the signal obtained at time t2 contains contributions from both the first and second sensing locations. To achieve this, the column for t2 is subtracted from the column for t3, and stored in a further column labelled t3-t2. In vector notation, the following operation is preformed: I(t3)−I(t2)=I (t3−t2), where I(t3−t2)=[I(t3, 1)−I(t2, 1), I(t3, 2)−I(t2, 2), I(t3, 3)−I(t2, 3) . . . ]

In general terms, to extract the acoustic signal from the $n^{th}$ sensing location, samples taken at returned times corresponding to the $(n-1)^{th}$ sensing location are subtracted from signals taken at a return time corresponding to the $n^{th}$ sensing location.

The return times at which signal at which signals are sampled will preferably be calculated from the distance of the sensing locations, provided these are known. Each vector I(tn) can then be stored in association with an identifier for the corresponding location.

The fibre 16 is configured as a coil at each sensing location in order to increase the area of fibre exposed to an acoustic disturbance at the sensing location. However, if the acoustic disturbance is large, the fibre need not be coiled. Alternatively, the fibre may be coupled to a sensing plate or diagram in order to increase the coupling at a sensing location.

If the fibre is coiled at the sensing location, each coil will have a length of between 20 m and 50 m. Pulses from the sources will typically be 0.5 µs (microseconds) in duration, with an intensity that is typically over 10 mW peak power. The fibre coils may be loosely held to allow acoustic waves to impinge easily on the different loop portions of fibre forming the coil. For example, a coil may hand freely from wall surface, affixed to the surface by a tie grouping together the respective loop portions.

The maximum repetition rate of the pulses transmitted from the source (which is effectively the sampling rate of the acoustic signals) will depend on the length of fibre, the time between pulses being greater than the round trip time to the end of the fibre and back. To detect audio signals, for example speech, a fibre length of 10 km would allow a sampling rate of 10 kHz and a frequency response of 5 kHz. For a sampling rate (and a pulse repetition rate) of 1 kHz, a 100 km length of fibre could be employed.

The subtraction of one column $t_{n-1}$ from another column $t_n$ need not be carried out after the sampling has been completed. For example, after the first pulse, the first row entries for the two columns may be subtracted, such that after the second pulse, only the second row entries need be subtracted, etc. This will allow the acoustic signals to be processed as they are being sampled.

It has been found that there is a low frequency cut-off at which the response of the monitoring station (that is, the amplitude of the interference signal for a disturbance of a given magnitude) diminishes rapidly. The low frequency cut-off depends on the differential delay introduced by the interferometer, the longer the delay, the lower the frequency of the cut-off. If f is the lowest frequency to be detected (the 6 dB point) an analysis has shown that the minimum differential path length of the interferometer arms is given by $L(min) \approx Arcsin(0.25)/(5.10^{-6}.\pi.f)$, where f is the desired cut-off frequency in Hz, and L(min) is measured in km. Thus, for 25 km, a cut-off point of 640 Hz is achieved, which is adequate for speech and other audio signals, which typically have a bandwidth of 300 Hz to 8 kHz.

The above embodiment will be useful in situations where a fibre path is arranged as coils at a plurality of locations, for example in a tunnel or under water, or where electrical components are not appropriate. If the fibre coils are situated in a tunnel, a person seeking help can shout. The location of the person can be inferred from the return time of the step feature in the return trace, and, by transmitting repeated pulses, the person's speech can be effectively sampled. In this way, the optical fibre can act as a microphone. Furthermore, different people can speak at different locations, the speech at each location being isolated form the speech at the other locations.

The invention claimed is:

1. A communication method comprising:
    transmitting non-coherent optical test signals onto an optical waveguide having substantially uniformly distributed inhomogeneities and a plurality of spaced-apart locations at which information is introduced, components of the transmitted test signals being caused by the waveguide to return in a distributed backscattering manner resulting from the uniformly distributed inhomogeneities as the test signals travel along the waveguide;
    receiving first component signals backscattered by the distributed inhomogeneities located along the waveguide beyond a first location at which information is introduced;
    receiving second component signals backscattered by the distributed waveguide inhomogeneities beyond a second location at which information is introduced, the second component signals being returned through the first location; and,
    performing a subtraction operation involving the second component signals and the first component signals, the operation distinguishing information introduced at the second location from information introduced at the first location,
    wherein the test signals are formed as pairs of signal copies, the signal copies of each pair being transmitted onto the waveguide with a temporal offset relative to one another, wherein the non-coherent optical test signals are generated by an optical signal source having a coherence time less than the temporal offset.

2. A communication method as claimed in claim 1, wherein the return component signals arising from respective copies of each given pair are temporally realigned.

3. A communication method as claimed in claim 1, wherein the return component signals arising from respective copies of each given pair are temporally realigned, and wherein realigned component signals are combined interferometrically.

4. A communication method as claimed in claim 1, wherein the return component signals arising from respective copies of each given pair are temporally realigned, wherein the realigned component signals are combined interferometrically, and wherein the combined component signals succeed one another so as to form a time-distributed return signal, the combined first component signal and the combined second component signal being identifiable from their respective temporal positions in the return signal.

5. A communication method as claimed in claim 1, wherein information is introduced by modulating the test signals.

6. A communication method as claimed in claim 1, wherein an acoustic disturbance is applied to the waveguide in order to introduce information thereon.

7. A communication method as claimed in claim 6, wherein the acoustic disturbance has the form of an audio signal.

8. A communication method as claimed in claim 1, wherein the distributed backscattering comprises Rayleigh backscattering resulting from the inhomogeneities distributed in a substantially uniform manner along the waveguide.

9. A communication apparatus comprising:
    a source for transmitting a non-coherent optical test signal onto an optical waveguide having a substantially uniform distribution of inhomogeneities and a plurality of spaced-apart locations at which information is introduced;
    a receiver for receiving a component of the test signal that has been caused by the waveguide to backscatter return in a time distributed manner along the waveguide from the inhomogeneities substantially uniformly distributed along the waveguide;
    timer means for evaluating return times; and
    processor means configured to capture the returned test signal at a first return time and at a second return time, and to perform a subtraction operation involving the return test signal captured at the first and the second return times,
    wherein the test signal is formed as pairs of signal copies, the signal copies of each pair being transmitted onto the waveguide with a temporal offset relative to one another, and wherein the non-coherent optical test signal is generated by a source having a coherence time less than the temporal offset.

10. A communication apparatus as claimed in claim 9, wherein the backscattering comprises Rayleigh backscattering resulting from the inhomogeneities distributed in a substantially uniform manner along the waveguide.

* * * * *